United States Patent [19]

Maeda et al.

[11] 4,384,735
[45] May 24, 1983

[54] SAFETY RESTRAINT SYSTEM HAVING TENSIONLESS TYPE BELT RETRACTOR ADAPTED FOR ADJUSTABLE SEAT

[75] Inventors: Kouzou Maeda, Yokohama; Ken Kamijo, Yokosuka, both of Japan

[73] Assignee: Nissan Motor Co., Ltd., Yokohama, Japan

[21] Appl. No.: 232,760

[22] Filed: Feb. 9, 1981

[30] Foreign Application Priority Data

Feb. 13, 1980 [JP] Japan .............................. 55-16983[U]

[51] Int. Cl.³ ............................................ B60R 21/10
[52] U.S. Cl. .................................. 280/801; 280/807; 297/479
[58] Field of Search ................ 280/801, 802, 803, 804, 280/806, 807, 808; 180/268, 269, 270; 297/477; 242/107.6

[56] References Cited

U.S. PATENT DOCUMENTS

| | | | |
|---|---|---|---|
| 2,708,966 | 5/1955 | Davis | 280/801 |
| 3,597,554 | 8/1971 | Siegal | 200/153 R |
| 3,876,031 | 4/1975 | Stouffer | 180/268 |
| 4,063,777 | 12/1977 | Takada | 297/477 |
| 4,109,962 | 8/1978 | Magyar | 297/477 |
| 4,198,011 | 4/1980 | Kamijo et al. | 280/807 |

FOREIGN PATENT DOCUMENTS

| | | |
|---|---|---|
| 2723295 | 12/1978 | Fed. Rep. of Germany . |
| 2844553 | 5/1979 | Fed. Rep. of Germany . |
| 53-45825 | 4/1978 | Japan . |
| 1472407 | 5/1977 | United Kingdom ................ 297/477 |

*Primary Examiner*—Robert R. Song
*Attorney, Agent, or Firm*—James Creighton Wray

[57] ABSTRACT

A safety restraint system for an occupant of a vehicle seat provided with adjusting means for varying the seat position and/or seatback inclination. The system comprises a seat belt, a retractor having a reel constantly biased toward retraction of the belt and a tension-eliminating mechanism including an electric actuator for inhibiting the reel from turning in the belt-retracting direction when the seat belt is worn by the occupant to cause closing of a primary control switch. The improvement resides in the provision of secondary control switch(es) coupled with the seat adjusting mechanism to make the tension-eliminating mechanism ineffective during operation of the adjusting means, thereby allowing the occupant to accomplish adjustment of the seat without the need of unfastening the seat belt and automatically adjusting the amount of protraction of the belt from the retractor in compliance with the change in the position or posture of the occupant.

7 Claims, 9 Drawing Figures

SAFETY RESTRAINT SYSTEM HAVING TENSIONLESS TYPE BELT RETRACTOR ADAPTED FOR ADJUSTABLE SEAT

BACKGROUND OF THE INVENTION

This invention relates to a safety restraint system for an occupant of an adjustable seat in a vehicle, and more particularly to an electromechanical coupling of a seat belt retractor having a tension-eliminating mechanism including an electrically operated actuator with a seat adjuster mechanism.

Developed recently as a component of a safety restraint system to protect a vehicle seat occupant during emergency conditions such as in a collision or sudden deceleration is a seat belt retractor of the so-called tensionless type. In a retractor of this type, a reel for winding a seat belt webbing is carried by a shaft which is constantly spring-biased in the direction to retract the webbing, so that the seat belt can be brought into a properly restraining state merely by pulling out a needful length of the webbing from the retractor to couple a tongue attached to the free end of the webbing to a buckle attached to a separately supported webbing of a short and definite length, or by closing a door in the case of a so-called passive safety belt. Since the exertion of a constant tension on the seat belt in this state causes considerable discomfort and inconvenience to the seat occupant, the retractor has a tension-eliminating mechanism which is a one-way locking mechanism to inhibit the reel from turning in the retracting direction by energization of an electrically operated actuator in response to closing of a buckle switch, or a door switch in the case of a passive seat belt, to force a detent to engage a ratchet. Even in this state the webbing can be protracted from the retractor according as the occupant changes his posture within the seat. In addition, the retractor has an emergency locking mechanism including a deceleration-responsive device the function of which results in engagement of another detent with another ratchet to inhibit the reel from turning in the belt-protracting direction.

The tension-eliminating function of this retractor is quite favorable for the comfort of the seat occupant, but it causes considerable inconvenience when this retractor is applied to an adjustable seat which is prevailing in the current cars. The occupant of such a seat often intends to change the position of the seat or the inclination of the seatback after wearing of the seat belt, but the accomplishment of the intention is inevitably accompanied by a change in the positional relation between the occupant and the seat belt maintained in the tensionless state, meaning a deviation of the seat belt from a properly restraining state. A serious problem arises particularly when the seat is moved rearward or the seatback is tilted backward because such a way of seat adjustment causes an increase in the amount of slack of the tensionless seat belt with respect to the changed position or posture of the seat occupant, so that the seat belt might become ineffective in restraining the occupant during an emergency. Therefore, it becomes necessary to unfasten the seat belt at each time of seat adjustment to allow the retractor to resume the retracting state and refastening the seat belt after completion of seat adjustment to thereby render the seat belt tensionless in a properly restraining state.

SUMMARY OF THE INVENTION

It is an object of the present invention to provide a safety restraint system for an occupant of an adjustable seat in a vehicle, which system employs a seat belt retractor of the above described tensionless type and has the ability of automatically adjusting the amount of protraction of the belt webbing from the retractor in compliance with adjustment of the seat position or the seatback inclination by the seat occupant wearing the seat belt, thereby eliminating the need of unfastening the seat belt during adjustment of the seat.

The present invention provides a safety restraint system for an occupant of an adjustable seat in a vehicle, the seat being provided with at least one adjusting means for moving the seat either entirely or partly, which restraint system includes a seat belt assembly, a seat belt retractor which has a winding reel constantly biased in the direction of retraction of a belt webbing, a deceleration-responsive emergency locking mechanism to inhibit the reel from turning in the direction of protraction of the webbing upon extraordinary deceleration of the vehicle and a tension-eliminating mechanism including a locking means to inhibit the reel from turning in the direction of retraction of the webbing and an electrically operated actuator means for selectively making the locking means effective and ineffective, and an electric circuit to operate the actuator means including a primary control switch arranged such that the locking means is made effective when the seat belt assembly is worn by the occupant. As the characterizing feature of the invention, the electric circuit comprises at least one secondary control switch each coupled with each of the aforementioned adjusting means such that the actuating means makes the locking means in the tension-eliminating mechanism ineffective during operation of each adjusting means irrespective of the state of the primary control switch.

Conveniently, each secondary control switch according to the invention is of a normally-closed type connected in series with the primary control switch responsive to wearing of the seat belt.

In the case of coupling a secondary control switch with a manually operated seat adjusting mechanism, it is preferable to employ a switch having a movable member constantly biased toward a detent part of a seat adjusting lever such that the manipulation of the lever causes opening of a switch contact by displacement of the movable member in the switch. In the case of an electrically operated seat adjusting mechanism, it is convenient to couple a secondary control switch according to the invention with a switch for actuation of the seat adjusting mechanism.

The seat belt in a safety restraint system according to the invention automatically assumes a properly restraining state and becomes tensionless when worn by the seat occupant in response to, for example, closing of a conventional control switch such as a buckle switch or a door switch. When the occupant operates a seat adjusting mechanism to move the seat forward or rearward, change the height of the seat or tilt the seatback, the tension-eliminating mechanism in the retractor automatically becomes ineffective in response to opening of a secondary control switch according to the invention, so that there occurs a suitable amount of retraction or protraction of the belt webbing in compliance with the movement of the occupant together with the seat. Upon completion of the seat adjusting operation, this control switch resumes the closed state to make the tension-eliminating mechanism again effective whereby the seat belt, which has already brought into a properly restraining state for the occupant in the changed position or posture, becomes again tensionless. Therefore, the occupant is allowed to freely adjust the seat after wearing of the seat belt without taking the trouble to unfasten the seat belt.

DESCRIPTION OF THE PREFERRED EMBODIMENTS

Figure 1:
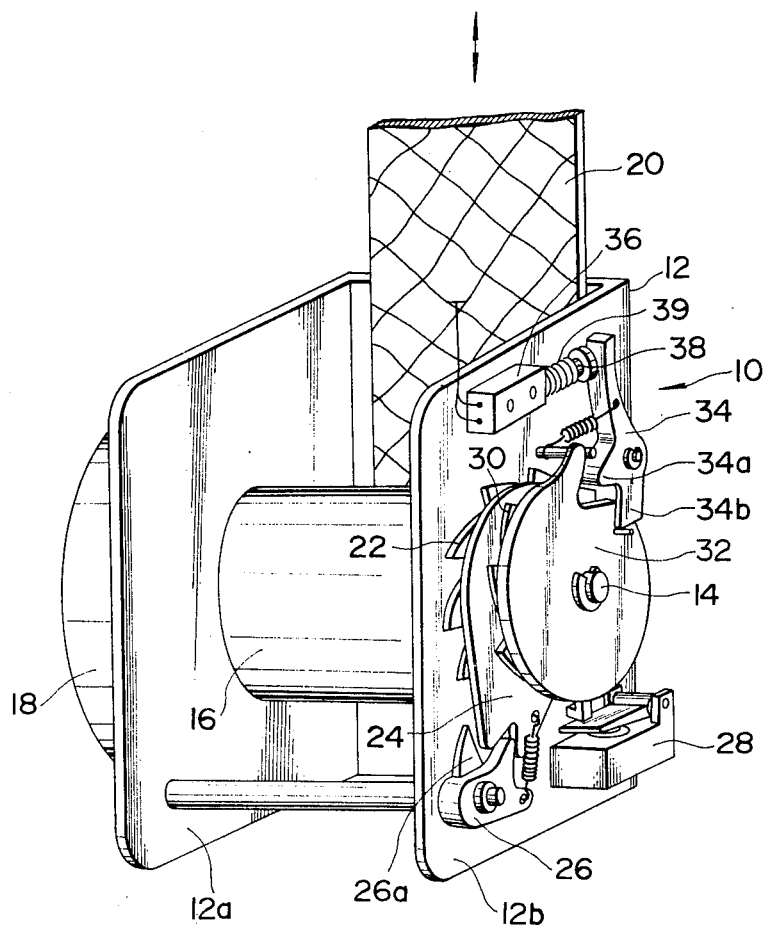
FIG. 1 is a perspective view of a known seat belt retractor employed in a safety restraint system according to the invention.

FIG. 1 illustrates an exemplary construction of known seat belt retractors of the type to be used in the present invention. The retractor indicated generally at 10 has a generally U-shaped frame 12 having two parallel side walls 12a, 12b. A shaft 14 is journalled in the apertures formed in the side walls 12a, 12b to rotatably span these side walls, and a reel 16 for winding a seat belt webbing 20 is coaxially fixed to the shaft 14 to rotate with this shaft. The shaft 14 is constantly biased to rotate in the clockwise direction in FIG. 1 to retract or wind the webbing 20 around the reel 16 by a spiral spring (not shown) which is enclosed in a spring cover 18 attached to the outer surface of the side wall 12a and is fastened at its one end to one end of the shaft 14 and at the other end to the side wall 12a.

On the outer side of the other side wall 12b, a first ratchet wheel 22 is fixedly mounted on the shaft 14, and a first cam 24 is rotatably mounted on the same shaft 14. A detent 26 having a ratchet pawl 26a engageable with the teeth of the ratchet wheel 22 is pivotally mounted on the side wall 12b so as to engage the cam 24. A deceleration-responsive device 28 is arranged in mechanical coupling with the cam 24 such that the pawl 26a of the detent 26 is normally disengaged from the ratchet wheel 22. However, in an emergency such as a collision or a panic stop of the vehicle the deceleration-responsive device 28 functions to rotate the cam 24 to thereby cause the pawl 26a to engage and lock the ratchet wheel 22, whereby the shaft 14 is prevented from turning in the counterclockwise direction, i.e. in the direction to allow protraction of the webbing 20.

Thus, the ratchet wheel 22, cam 24, detent 26 and the deceleration-responsive device 28 constitute an emergency locking mechanism.

A second ratchet wheel 30 is fixedly mounted on the shaft 14 and a second cam 32 is rotatably mounted on the shaft 14. A second detent 34 having a ratchet pawl 34a engageable with the second ratchet wheel 30 and an arm 34b to engage the cam 32 is pivotally mounted on the side wall 12a, and an electrically operated actuator 36, in this case a solenoid actuator having a plunger 38, is arranged to selectively keep the detent 34 in one of two angular positions. In the illustrated state where the solenoid in the actuator 36 is deenergized, the plunger 38 is projected under the force of a spring 39 to bias the detent 34 in the clockwise direction, whereby the arm 34b of the detent 34 is kept in engagement with the cam 32 whereas the pawl 34a is kept disengaged from the ratchet wheel 30. Accordingly, in this state the webbing 20 can be retracted by the spring-biased reel 16. When an electric circuit for energization of the actuator 36 is established by closing of a switch caused by fastening of the seat belt by a seat occupant the plunger 38 is retreated to allow the detent 34 to pivot counterclockwise, causing the arm 34b of the detent 34 to disengage from the cam 32 and the pawl 34a to engage the ratchet wheel 30, so that the shaft 14 is prevented from turning in the clockwise direction, i.e. in the direction to further retract the webbing 20. In this state the retractor 10 merely holds one end of the fastened seat belt without exerting a tension thereon. Even in this state, it is possible to extend the belt webbing 20 from the reel 16 unless the pawl 26a of the first detent 26 is in engagement with the first ratchet wheel 22. Thus, the second ratchet wheel 30, second cam 32, second detent 34 and the actuator 36 constitute a one-way stop mechanism or tension-eliminating mechanism.

Figure 2:
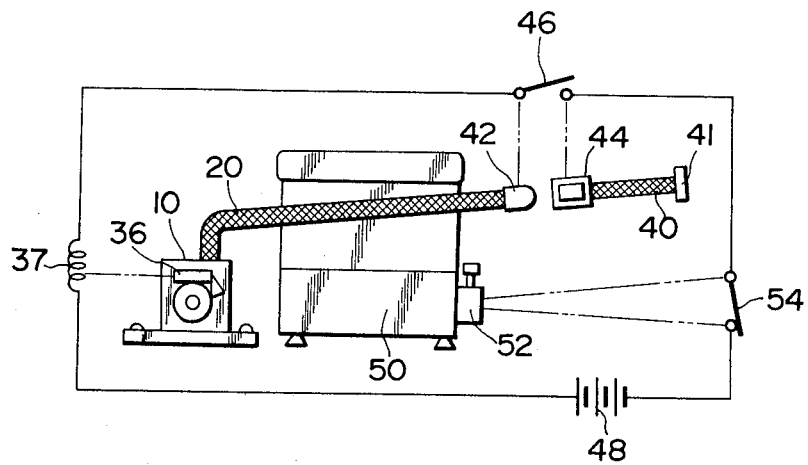
FIG. 2 is a diagrammatic presentation of a safety restraint system as an embodiment of the present invention.

FIG. 2 is an exemplary illustration of a safety restraint system according to the invention to restrain an occupant (not illustrated) of a seat 50 during emergency conditions. The seat 50 is provided with at least one adjuster mechanism 52 to move the seat forward and rearward and/or to tilt the seatback. In this case, a seat belt for the occupant consists of the webbing 20 protractable from the retractor 10 which is fixed to the vehicle body at a suitable location and another webbing 40 one end of which is supported by a retainer 41 fixed to the vehicle body. Fastening of the seat belt can be accomplished by extending a needful length of the webbing 20 from the retractor 10 against the biasing force in the retracting direction and coupling a tongue 42 and a buckle 44 attached to the free ends of the respective webbings 20 and 40. The electric circuit to feed an actuating current from a power source 48 such as a battery to solenoid 37 of the actuator 36 in the retractor 10 includes at least one normally-closed switch 54 which will be described later and a buckle switch 46 which is closed when the tongue 42 and buckle 44 are coupled properly. Accordingly, the solenoid 37 is energized in response to the coupling of the tongue and buckle 42, 44 to result in that the fastened seat belt becomes tensionless by the action of the above described tension-eliminating mechanism of the retractor 10.

The normally-closed switch 54 is connected in series with the buckle switch 46 and is mechanically associated with the seat adjuster mechanism 52 such that this switch 54 assumes the open state during operation of the seat adjuster mechanism 52. The opening of the switch 54 means deenergization of the solenoid 37 although the buckle switch 46 remains in the closed state so that the tension-eliminating mechanism in the retractor 10 becomes ineffective and allows the webbing 20 to be either retracted or extended in compliance with the movement of the seat 50 and also with a change in the posture of the seat occupant during or after operation of the adjuster mechanism 52. Upon completion of the operation of the adjuster mechanism 52, the switch 54 reverts to the closed state whereby the tension-eliminating mechanism in the retractor 10 becomes again effective. Thus, adjustment of the seat position or the seatback inclination is automatically accompanied by a corresponding adjustment of the amount of the protraction of the webbing 20 without the need of uncoupling of the tongue and buckle 42, 44, with the result that the belt assumes a tensionless restraint state just appropriate to the position and posture of the seat occupant after the adjustment of the seat.

The arrangement and construction of the seat switch(s) 54 will be described more in detail with reference to FIGS. 3-5 by way of example.

Figure 3:
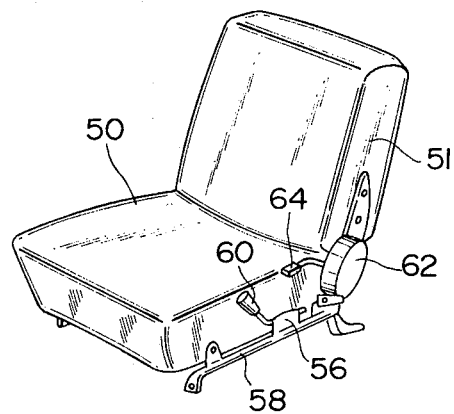
FIG. 3 is a perspective view of an automobile seat to which the present invention is applied.

FIG. 3 shows an automobile seat 50 provided with a seat slide mechanism 56 to move the seat along guide rail 58 either forward or rearward by manipulating a lever 60 and another mechanism 62 to adjust the degree of tilting of seatback 51 by manipulating a lever 64.

Figure 4:
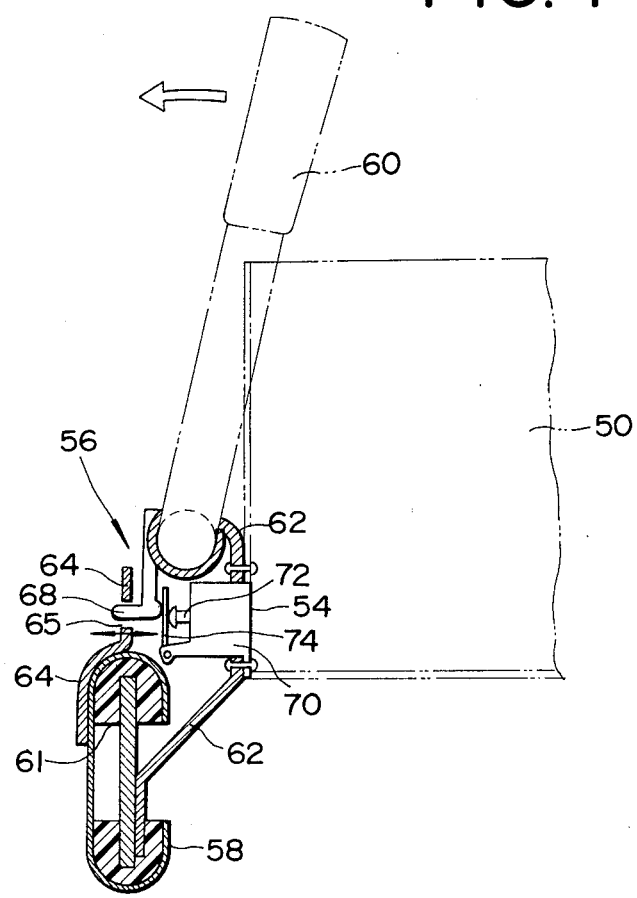
FIG. 4 is a sectional view of a seat slide mechanism provided with a switch which is a component of a safety restraint system according to the invention.

Referring to FIG. 4, the seat slide mechanism 56 has a slider 61 which is fixed to a support bracket 62 fixed to the frame of the seat 50 and slidably engages the rail 58 which is fixed to the vehicle floor (not illustrated). A bracket 64 having a plurality of locking apertures 65 is fixed to an upper part of the rail 58, and the lever 60 is pivotally mounted on an upwardly projecting part of the support bracket 62. The lever 60 has a locking pawl 68 fittable into the apertures 65 of the bracket 64 and is constantly biased by a spring (not shown) in the direction to keep the pawl 68 in engagement with one of the apertures 65. To move the seat 50 either forward or rearward, the lever 60 is pivoted counterclockwise in FIG. 4 to thereby disengage the pawl 68 from the apertured bracket 64. A normally-closed switch 54 as a component of the system of FIG. 2 is mounted on the support bracket 62 and has a mechanically movable part (72, 74) which is arranged in contact with one end of the pawl 68 of the lever 60 such that the switch 54 opens when the lever 60 is manipulated to disengage the pawl 68 from the bracket 64.

Figure 5:
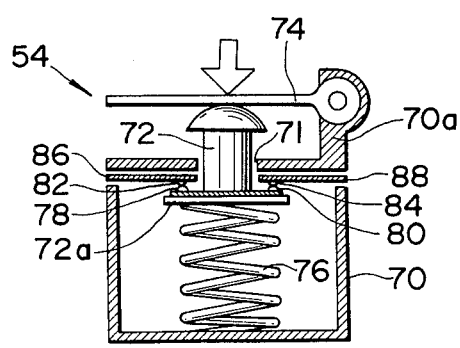
FIG. 5 is an enlarged and sectional view of the switch in FIG. 4.

As shown in FIG. 5, this switch 54 has a box-like case 70 formed with an opening 71 in a front wall facing the pawl 68. Disposed in this case 70 is a movable member 72 having a generally cylindrical portion which is partially protruding from the case 70 through the opening 71 and a flanged inner end portion 72a to which a spring 76 is attached to bias the movable member 72 outwardly, i.e. toward the pawl 68. A plate 74 is pivotally attached to a projection 70a of the case 70 such that this plate 74 is always interposed between and in contact with one end of the pawl 68 and the protruding end of the movable member 72. It will be possible to design the movable member 72 so as to constantly make a direct contact with the pawl 68 to thereby omit the plate 74, but the provision of this plate 74 is more favorable for maintenance of a sure contact.

Fixed to the flanged part 72a of the movable member 72 are two electric terminals 78 and 80 which are electrically connected to each other. On the inner side of the front wall of the case 70, there are two electric terminals 82 and 84 with two leads 86 and 88 connected respectively to these two terminals 82, 84. The lead 86 is connected to the battery 48 in FIG. 2 and the other lead 88 to the buckle switch 46. These terminals are arranged such that the two terminals 78, 80 on the movable member 72 are normally in contact with the terminals 82, 84 on the case 70, respectively, so that this switch 54 is normally in the closed state. When the movable member 72 is pushed inward against the force of the spring 76 by the movement of the plaw 68 in the direction to disengage from the apertured bracket 64, the terminals 78, 80 part from the terminals 82, 84 to break the electrical connection between the two leads 86 and 88, so that the switch 54 assumes the open state.

Accordingly the tension-eliminating mechanism in the retractor 10 becomes ineffective during operation of the seat slide mechanism 56 of FIG. 4, so that the amount of retraction of the webbing 20 from the retractor 10 varies automatically in compliance with the forward or rearward movement of the seat 50 while the tongue 42 and buckle 44 are kept in engagement. When the lever 60 is allowed to pivot clockwise in FIG. 4 after an intended displacement of the slider 61 to make the pawl 68 engage a newly selected aperture 65 in the bracket 64, the movable member 72 follows the movement of the pawl 68 until the terminals 78, 80 thereon come into contact with the terminals 82, 84 to result in closing of the switch 54. Then the tension-eliminating mechanism in the retractor 10 becomes effective so that the seat belt, which has been worn by the occupant and has automatically been adjusted to the changed position of the occupant, becomes tensionless.

In this embodiment the switch 54 is so designed as to be operated by the plaw 68 of the lever 60, but this is not limitative. The object is achieved insofar as the switch 54 is selectively closed and opened by pivotal movement of the lever 60.

Figure 6:
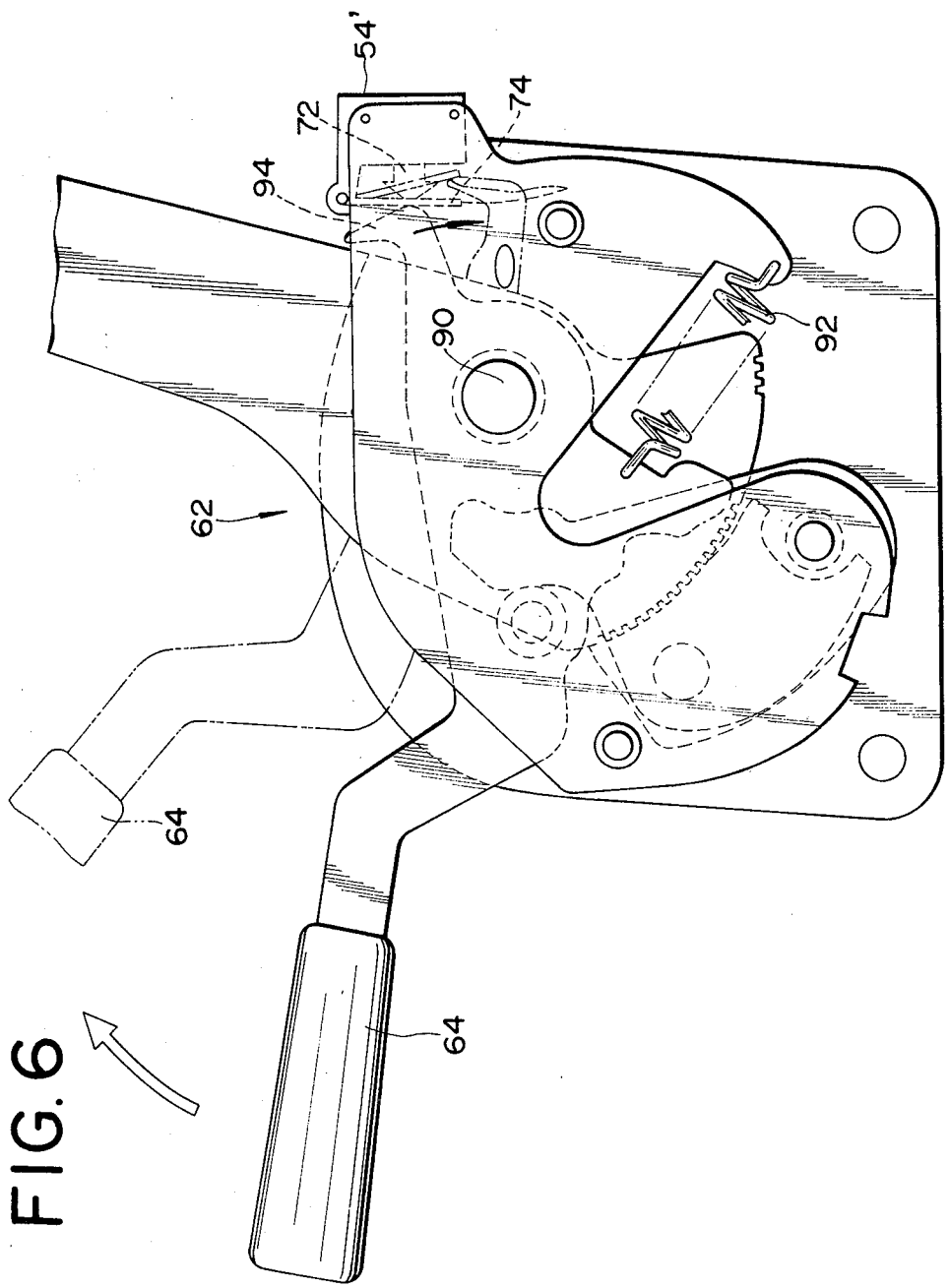
FIG. 6 is a side view of a seat tilting mechanism provided with a switch which is a component of a safety restraint system according to the invention.

FIG. 6 shows an example of the methods of coupling a normally-closed switch 54' corresponding to the switch 54 in FIG. 2 with the seatback tilting mechanism 62 in FIG. 3. Indicated at 90 is an axle as the axis of pivotal movement of the lever 64. The lever 64 is provided with a return spring 92 and has a claw-like projection 94 formed at its one end. The switch 54' is identical in construction with the switch 54 illustrated in FIG. 5 and is fixed to the seat frame such that the movable member 72 protruding from the switch case is always biased to the projection 94 of the lever 64 with the interposal of the pivotal plate 74.

To adjust the inclination of the seatback 51, the lever 64 is pulled upwards in FIG. 3 to rotate clockwise in FIG. 6. Then a rotational movement of the projection 94 forces the movable member 72 of the switch 54' to move inwards to thereby cause opening of this switch 54' in the same manner as described with respect to the switch 54 in FIGS. 4 and 5. It will be unnecessary to repeat the description about the release of the tension-eliminating mechanism in the retractor 10 from the locked state resulting from opening of the switch 54'.

Figure 7:
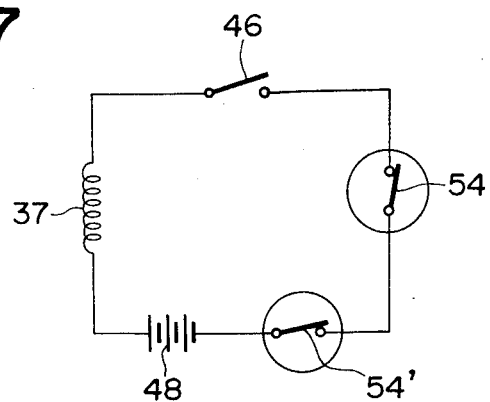
FIG. 7 is a circuit diagram of a safety restraint system having the two switches respectively shown in FIGS. 4 and 6.

When the seat is provided with both the seat slide mechanism 56 and seatback tilting mechanism 62 as shown in FIG. 3, the switch 54 coupled with the former mechanism 56 and the switch 54' coupled with the latter mechanism 62 are connected in series with each other as shown in FIG. 7 so that the solenoid 37 may be deenergized by opening of either one of these two switches 54, 54'. If the seat is additionally provided with a seat height adjuster mechanism (not illustrated), another normally-closed switch corresponding to the above described switch 54 is coupled with the height adjuster mechanism and is also connected in series with the other switches 46, 54 and 54'.

Figure 8:
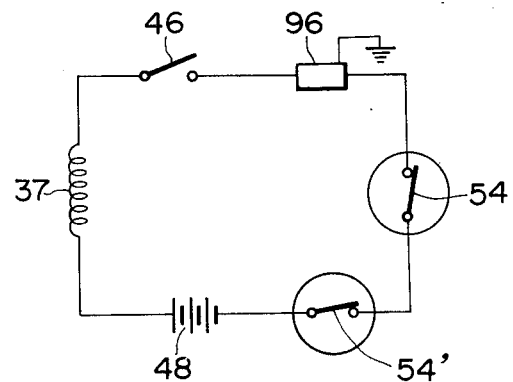
FIG. 8 is a circuit diagram showing a modification of the system of FIG. 7.

Referring to FIG. 8, the current feeding circuit for the solenoid 37 may preferably include a delay timer 96, which is connected in series with the normally-closed switches 54, 54' and has the function of keeping this circuit in the broken state for a predetermined length of time after closing of the once opened switch 54 or 54', for the purpose of allowing the occupant to return to the normal sitting position after completion of seat adjustment while the tension is still exerted on the seat belt worn by the occupant. This is because of the possibility of protraction of an excess length of belt webbing from the retractor during operation of a seat adjusting mechanism. Particularly in the case of manipulating the lever 60 of the seat slide mechanism 56, the occupant is obliged to considerably change his posture from the normal sitting position and accordingly is liable to pull out a considerable length of belt webbing from the retractor. Therefore, if releasing of the lever 60 is immediately followed by actuation of the tension-eliminating mechanism in the retractor, the seat belt will become tensionless possibly with an unduly large amount of slack which is unfavorable for protection of the occupant during an emergency condition. The delay timer 96 defers actuation of the tension-eliminating mechanism to allow the retractor to retract the excess length of the belt as the occupant resumes his normal sitting position, so that the seat belt assumes a properly restraining state before it becomes tensionless.

Figure 9:
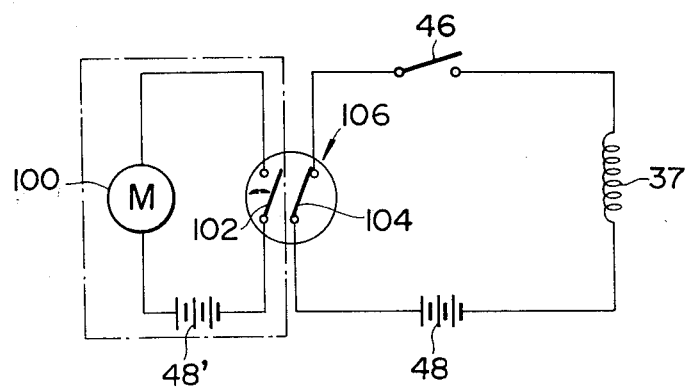
FIG. 9 is a circuit diagram showing a safety restraint system according to the invention applied to an electrically adjustable seat.

FIG. 9 illustrates a case where the present invention is applied to a seat provided with an electrically operated adjuster mechanism including a motor 100 and a normally-open switch 102 the closing of which establishes electrical connection of the motor 100 with a battery 48'. In this case, a circuit for energization of the solenoid 38 in the retractor 10 includes a normally-closed switch 104 which is connected in series with the buckle switch 46 and mechanically coupled with the normally-open switch 102 such that the two switches 102 and 104 constitute a combination switch 106. More particularly, the normally-closed switch 104 is made to open simultaneously with closing of the normally-open switch 102 and to resume the closed state upon opening of the latter switch 102. Of course the two switches 102 and 104 are electrically insulated from each other. As will be apparent, the actuation of the motor 100 for adjustment of the seat causes deenergization of the solenoid 37 in the retractor 10, so that the tension is exerted on the seat belt during operation of the seat adjuster mechanism. When the motor 100 is deenergized, the solenoid 37 is again energized to make the tension-eliminating mechanism effective.

In the illustrated embodiments, the current feeding circuit for the solenoid 37 was described to include the buckle switch 46 as a primary control switch, but it will be understood that, in the case of a safety restraint system having a passive seat belt, a door switch can be employed as the primary control switch in place of the buckle switch 46 with no modification of the other elements.

What is claimed is:

1. A safety restraint system for an occupant of an adjustable seat in a vehicle, the seat being provided with at least one adjusting means for moving the seat either entirely or partly, the restraint system including a seat belt, a seat belt retractor which has a winding reel constantly biased in the direction of retraction of a belt webbing, a deceleration-responsive emergency locking mechanism to inhibit the reel from turning in the direction of protraction of the webbing upon extraordinary deceleration of the vehicle and a tension-eliminating mechanism including a locking means to inhibit the reel from turning in the direction of retraction of the webbing and an electrically operated actuator means for selectively making the locking means effective and ineffective, and an electric circuit to operate the actuator means including a primary control switch arranged such that the locking means is made effective when the seat belt is worn by the occupant, the improvement comprising said electric circuit further comprising at least one secondary control switch each coupled with each of said at least one adjusting means such that said actuator means makes said locking means in said tension-eliminating mechanism ineffective during operation of each adjusting means irrespective of the state of said primary control switch, wherein each of said at least one secondary switch is a normally-closed switch connected in series with said primary control switch.

2. A safety restraint system according to claim 1, wherein each of said at least one adjusting means is of a manually operated type, each of said secondary control switch having a body, a movable member, a biasing means for constantly pressing said movable member against a movable part of the adjusting means, a set of electrical contact points one of which is attached to said movable member while the other is attached to said body such that said contact points are normally in the contacting state but become parted when said movable member is moved against the force of said biasing means by movement of said movable part of the adjusting means during operation of the adjusting means.

3. A safety restraint system according to claim 2, wherein said movable part of the adjusting means is a part of a lever for manual operation of the adjusting means.

4. A safety restraint system according to claim 1, wherein each of said at least one adjusting means is of an electrically operated type including an electric driving means and a normally-open switch the closing of which establishes a circuit for actuation of said electric driving means, each of said secondary control switch being mechanically coupled with said normally-open switch such that closing of said normally-open switch causes simultaneous opening of the coupled secondary control switch.

5. A safety restraint system according to claim 1, wherein said electric circuit further comprises a delay timer switch means for keeping said electric circuit in the broken state for a predetermined length of time after closing of any one of said at least one secondary control switch.

6. A safety restraint system according to claim 1, wherein the seat belt has a combination of a tongue and a buckle, said primary control switch being coupled with said combination so as to close when said tongue engages said buckle.

7. A safety restraint system according to claim 1, wherein said at least one adjusting means comprises first means for moving the seat forward and rearward and second times for adjusting the inclination of a seatback of the seat.

* * * * *